(12) United States Patent
Dantzie

(10) Patent No.: US 8,851,484 B2
(45) Date of Patent: Oct. 7, 2014

(54) STEERABLE WHEEL ASSEMBLY FOR A VEHICLE, AND VEHICLE INCLUDING SUCH AN ASSEMBLY

(75) Inventor: Samuel Dantzie, Legbourne (GB)

(73) Assignee: Deborah Ann Dantzie, Legbourne (GB)

( * ) Notice: Subject to any disclaimer, the term of this patent is extended or adjusted under 35 U.S.C. 154(b) by 0 days.

(21) Appl. No.: 14/115,434

(22) PCT Filed: Apr. 20, 2012

(86) PCT No.: PCT/GB2012/050881
§ 371 (c)(1),
(2), (4) Date: Nov. 5, 2013

(87) PCT Pub. No.: WO2012/150443
PCT Pub. Date: Nov. 8, 2012

(65) Prior Publication Data
US 2014/0083785 A1    Mar. 27, 2014

(30) Foreign Application Priority Data

May 4, 2011    (GB) .................................. 1107427.5

(51) Int. Cl.
*B60G 3/14*    (2006.01)
*B60G 17/02*   (2006.01)
*B60G 3/20*    (2006.01)
*B60K 7/00*    (2006.01)

(52) U.S. Cl.
CPC ............... *B60G 3/14* (2013.01); *B60G 17/021* (2013.01); *B60G 3/20* (2013.01); *B60G 2206/50* (2013.01); *B60K 7/0007* (2013.01); *B60G 2200/144* (2013.01); *B60G 2200/10* (2013.01); *B60G 2300/07* (2013.01)
USPC .............. 280/6.156; 280/124.153; 280/6.155; 280/124.117; 280/124.121; 180/65.51

(58) Field of Classification Search
CPC .......... B60G 3/14; B60G 17/00; B60G 11/14; B60G 11/16; B60G 3/185; B60G 3/207; B60G 2200/10; B60G 2206/50; B60G 2300/07
USPC .................... 280/124.128, 124.125, 124.101, 280/124.117, 124.153, 5.514, 5.515, 6.155, 280/6.156; 180/24.07, 253, 65.51
See application file for complete search history.

(56) References Cited

U.S. PATENT DOCUMENTS

| 1,916,098 | A | 6/1933 | Dubonnet |
| 2,271,304 | A | 1/1942 | Mulholland |

(Continued)

FOREIGN PATENT DOCUMENTS

| DE | 102009053123 A1 | 5/2011 |
| FR | 2453741 A1 | 3/1979 |
| GB | 2075442 A | 3/1981 |

OTHER PUBLICATIONS

UK Search Report dated Aug. 16, 2011 for GB Application No. GB1107427.5 filed May 4, 2011, 4 pages.

(Continued)

*Primary Examiner* — Ruth Ilan
(74) *Attorney, Agent, or Firm* — Maine Cernota & Rardin

(57) ABSTRACT

A steerable wheel assembly comprising a mounting bracket (1) incorporating a vertical pivot mounting (2) for attachment to the vehicle. A second bracket (6) has a first arm (7) carrying a road wheel and a second arm (8) generally upstanding from the first and linked at the upper end thereof to the mounting bracket by a parallelogram linkage (4,5). A spring and shock-absorber unit (9) is pivotally connected between the second bracket and the parallelogram linkage.

Another aspect of the invention provides a vehicle suspension system comprising a mounting bracket (20) for attachment to a vehicle body or chassis, and a wheel-mounting arm (21) pivotally attached to the mounting bracket and having a wheel mounted thereon. A spring and shock-absorber unit (22) extends between the mounting bracket and the wheel-mounting arm, at least one end of the spring and shock-absorber unit being connected through a member (23) whose position is adjustable along the axis of the respective bracket or arm.

13 Claims, 3 Drawing Sheets

(56) References Cited

U.S. PATENT DOCUMENTS

| | | | |
|---|---|---|---|
| 2,616,686 A | 11/1952 | Gregoire | |
| 2,998,980 A * | 9/1961 | Ulinski | 280/124.113 |
| 3,278,197 A | 10/1966 | Gerin | |
| 3,433,318 A * | 3/1969 | Packard | 180/213 |
| 3,858,902 A * | 1/1975 | Howells et al. | 280/6.159 |
| 4,241,803 A | 12/1980 | Lauber | |
| 6,581,711 B1 * | 6/2003 | Tuluie | 180/227 |
| 7,213,824 B1 * | 5/2007 | McGhie | 280/124.112 |
| 2002/0190491 A1 * | 12/2002 | Strong | 280/124.128 |
| 2002/0190492 A1 | 12/2002 | Strong | |
| 2006/0001223 A1 | 1/2006 | Krieger | |
| 2006/0186616 A1 | 8/2006 | Rudiger | |
| 2006/0254840 A1 * | 11/2006 | Strong | 180/190 |

OTHER PUBLICATIONS

PCT Search Report dated Aug. 5, 2013 of PCT Application No. PCT/GB2012/050881 filed Apr. 20, 2012, 7 pages.

"Mercedes Classe A: Revue et Corrigee", Ingenieurs de l'Automobile, Editions VB, Garches, FR, No. 718, Jan. 1, 1998, p. 10-11.

* cited by examiner

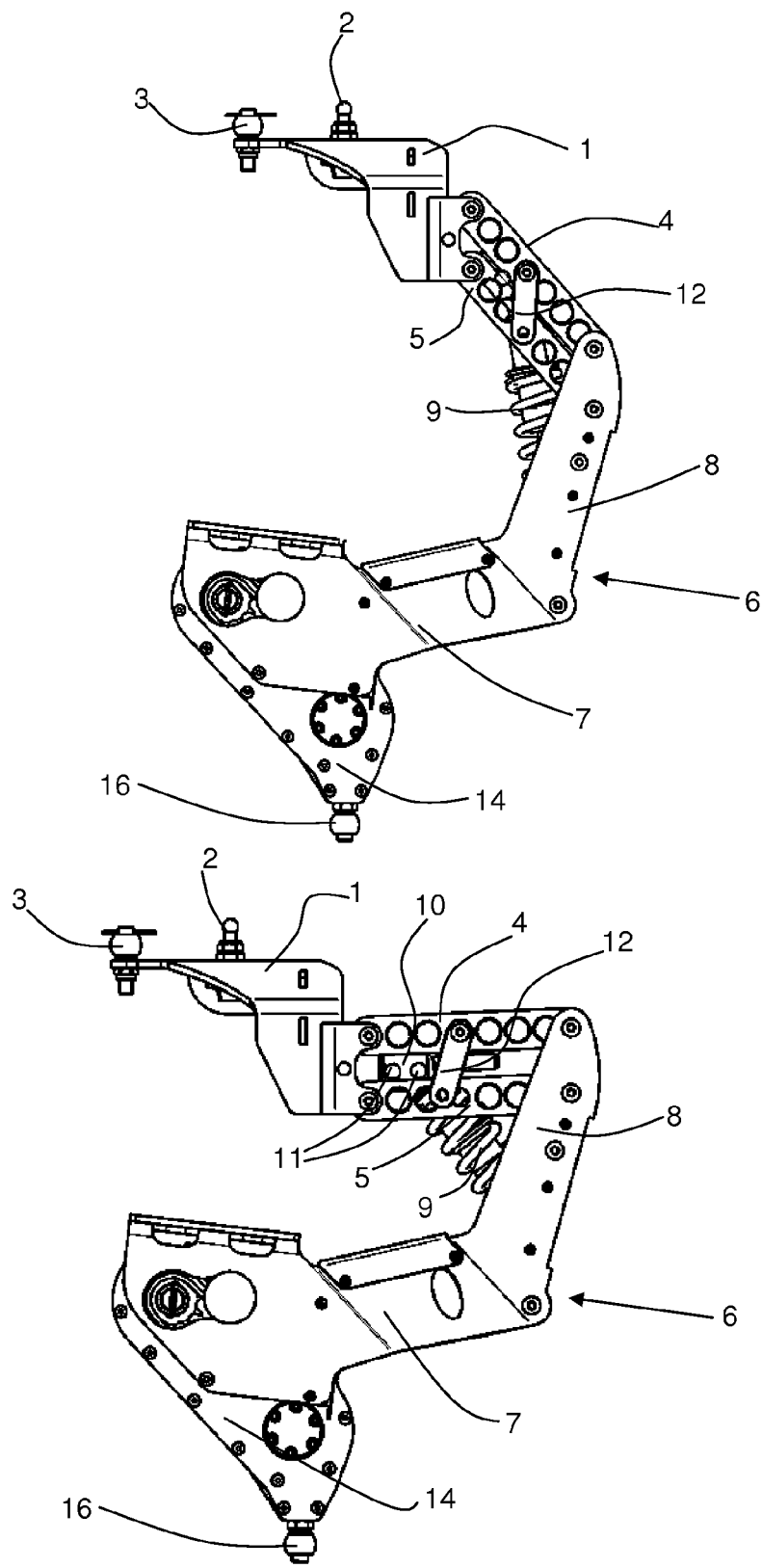

to the vehicle body or frame, and a ball connector 3 for a steering arm or the like. The mounting bracket 1 pivotally mounts two parallel arms 4 and 5 so as to be rotatable in a vertical plane. The arms 4 and 5 may be formed as flat plates or as integral parts of a pressing or casting or other component. A second bracket 6 has a first arm 7 mounting a road wheel (not shown) and a second arm 8 extending upwardly from the first 7 with an obtuse angle between the arms. The opposite ends of the arms 4 and 5 are pivotally connected to the second arm 8, creating a parallelogram linkage between the mounting bracket 1 and the second bracket 6. A spring and shock-absorber unit 9 extends between swivel mounts on the second arm 8 and in the parallelogram linkage. The swivel mount 10 in the parallelogram linkage consists of a slide member located between the pairs and having projecting from opposed sides thereof pairs of short studs having enlarged circular heads 11 to retain the studs as they slide along either the upper or lower of the arms 4 or 5, depending on the loading on the assembly. The mount 10 is engaged on an elongate screw-threaded member extending from a head member pivotally mounted on the mounting bracket. Rotation of the screw-threaded member causes the position of the swivel mount along the parallelogram linkage to be adjustable to adapt the suspension provided thereby to suit different conditions. The purpose of this adjustment enables the 'shock' travel of the absorber to be increased or decreased automatically dependant on the type of terrain encountered. As the shock travel increases, there is a proportional decrease in the loadings placed on the spring, thus allowing for a 'soft or hard' ride dependent on the position of the shock. This could be done manually, for example to set up the suspension for particular expected surface conditions, or it could be controlled dynamically in accordance with the output of sensors detecting the motion of the vehicle, for example. It will be appreciated that dynamic control might require a quicker-acting adjustment than might be achieved by a motor-driven screw, for example a hydraulic or pneumatic actuator.

STEERABLE WHEEL ASSEMBLY FOR A VEHICLE, AND VEHICLE INCLUDING SUCH AN ASSEMBLY

RELATED APPLICATIONS

This application is a national phase application filed under 35 USC §371 of PCT Application No. PCT/GB2012/050881 with an International filing date of Apr. 20, 2012, which claims priority to GB 1107427.5, filed May 4, 2011. Each of these applications is herein incorporated by reference in their entirety for all purposes.

FIELD OF THE INVENTION

This invention relates to a steerable wheel assembly for a vehicle, and to a vehicle having at least one such assembly.

BACKGROUND TO THE INVENTION

In the construction of small powered vehicles for all-terrain use, there are a number of design constraints to achieving a practical configuration which offers sufficient comfort and the ability to cope with difficult terrain. In particular, there is the need to achieve at least one steerable wheel with a shock-absorbing suspension system that is light in weight and which does not occupy too much of the volume of the vehicle needed for the occupant or occupants.

While one solution to the problem might be to use small-diameter wheels, this would render the vehicle less capable of climbing obstacles when used on surfaces that are not flat, level and uninterrupted. The use of larger-diameter wheels, for example greater than approximately 350 mm diameter, creates difficulties in designing a suspension system that will allow sufficient vertical travel while allowing for rotation about an axis for steering without the mechanical geometry intruding significantly into the user space.

SUMMARY OF THE INVENTION

According to a first aspect of the invention, there is provided a steerable wheel assembly for a vehicle, comprising a mounting bracket incorporating a vertical pivot mounting for attachment to the vehicle, a second bracket having a first arm carrying a road wheel and a second arm generally upstanding from the first and linked at the upper end thereof to the mounting bracket by a parallelogram linkage, and a spring and shock-absorber unit pivotally connected between the second bracket and the parallelogram linkage.

Another aspect of the invention provides a vehicle suspension system comprising a mounting bracket for attachment to a vehicle body or chassis, a wheel-mounting arm pivotally attached to the mounting bracket and having a wheel mounted thereon, and a spring and shock-absorber unit extending between the mounting bracket and the wheel-mounting arm, at least one end of the spring and shock-absorber unit being connected through a member whose position is adjustable along the axis of the respective bracket or arm.

Other features of the invention are set out in the claims.

BRIEF DESCRIPTION OF THE DRAWINGS

In the drawings, which illustrate exemplary embodiments of the invention:

FIG. 1 is a side elevation of a steerable wheel assembly according to one aspect of the invention, shown in the open or unloaded position thereof;

FIG. 2 is a corresponding view of the assembly in a closed or loaded position;

DETAILED DESCRIPTION OF THE ILLUSTRATED EMBODIMENT

Figure 3:
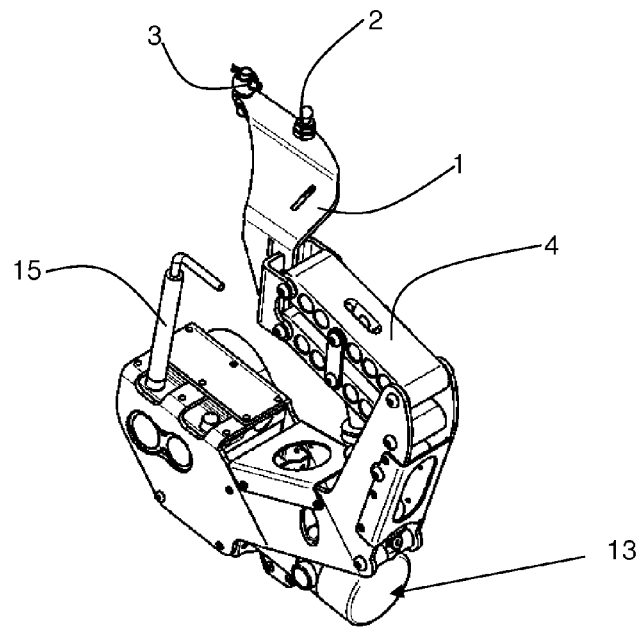
FIG. 3 is a perspective view of the assembly from above and to one side.

Referring first to FIGS. 1 to 3, the steerable wheel assembly has a mounting bracket 1 provided with a vertical pivot mounting 2 for rotatable attachment of the assembly A similar mounting arrangement is provided on the second arm 8 for the mounting of the other end of the spring and shock-absorber unit 9.

A pair of linkages 12 is provided between the upper and lower arms 4 and 5 to distribute shock loadings between the arms.

The free end of the first arm 7 mounts an electric motor 13 and gearbox 14 containing suitable speed-reducing gearing to permit the driving of a wheel mounted thereon (not shown) at a controlled speed. A control lever 15 (FIG. 3) may be provided to permit selective disengagement of the motor from the drive to allow free-wheeling of the assembly when required.

A ball joint 16 is provided on the underside of the second bracket 6 to permit the attachment of supporting arms (not shown) extending from ball joints mounted on the vehicle body or chassis. This supports the steering axis laterally, while allowing the suspension unit to extend or contract according to the demands of the terrain over which the vehicle is travelling, while taking account of the loading of the vehicle.

The steerable wheel assembly of the invention permits long travel of the suspension to accommodate the movement over uneven terrain, while at the same time minimising the space occupied.

Figure 4:
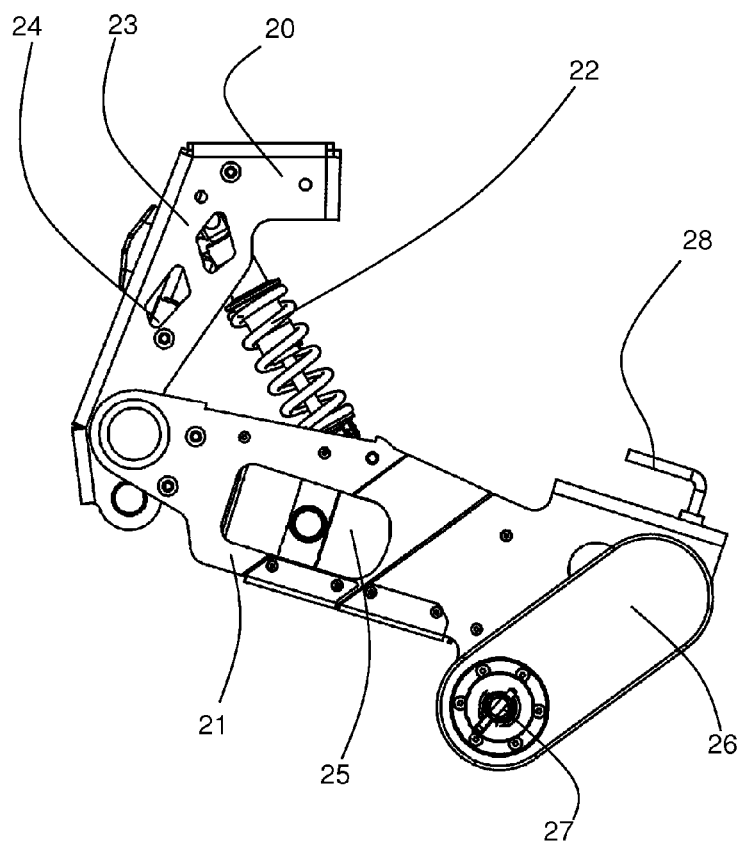
FIG. 4 is a side elevation of a vehicle suspension system without steering capability, in accordance with another aspect of the invention.
Figure 5:
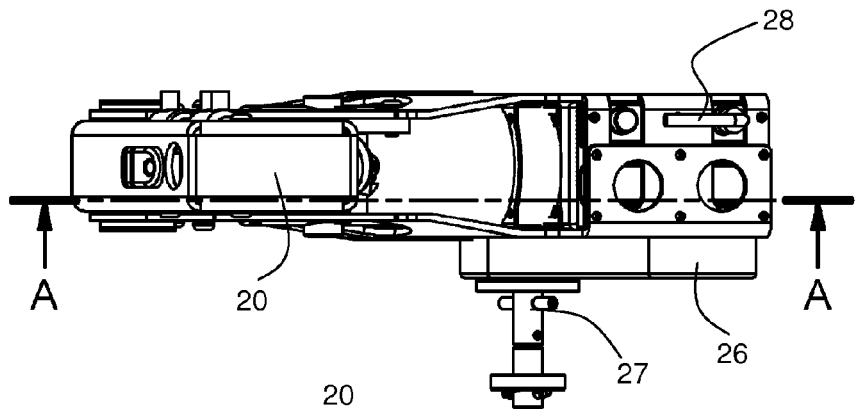
FIG. 5 is a top plan view of the vehicle suspension system shown in FIG. 4.
Figure 6:
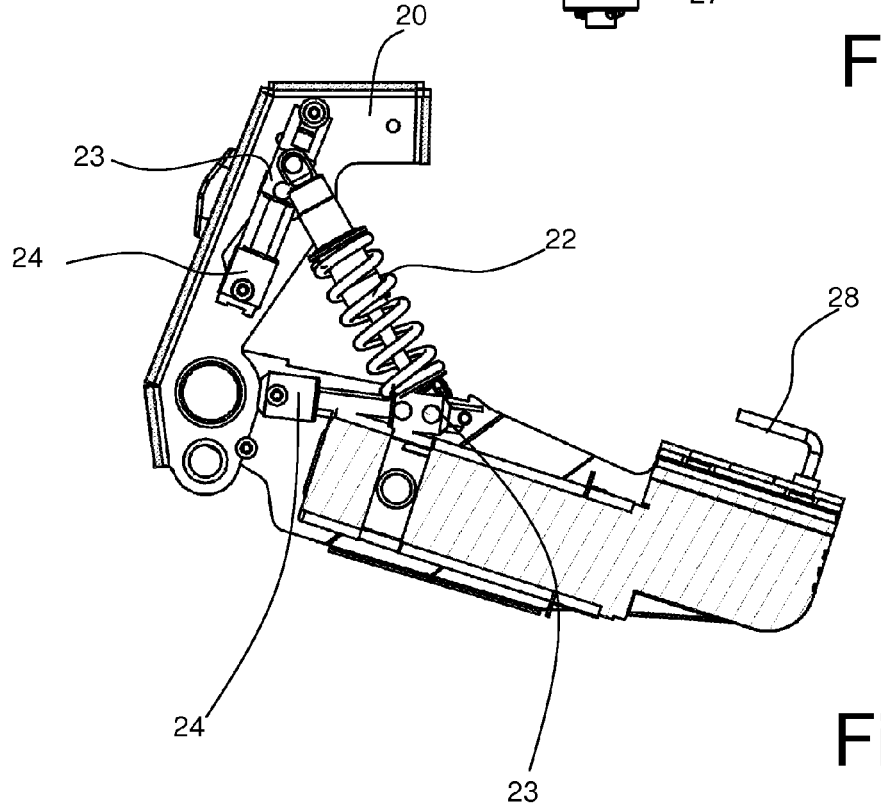
FIG. 6 is a sectional view on line A-A in FIG. 5.

Referring now to FIGS. 4 to 6, the non-steerable suspension unit comprises a mounting bracket 20 by which the unit is secured to the vehicle body or frame, and a second bracket 21 pivotally connected thereto so as to be movable in a generally vertical plane. A spring and shock-absorber unit 22 extends between the mounting bracket 20 and the second bracket 21, each end of the unit 22 being carried by a swivel mount 23 (FIG. 6) whose position along the relevant bracket can be adjusted by a screw-adjuster 24 in the same manner as the swivel mounts 10 in the embodiment described with reference to FIGS. 1 to 3. The second bracket 21 carries an electric drive motor 25, linked through a gear drive 26 to an axle 27 which, in use, mounts a wheel (not shown). A control lever 28 is provided to permit selective disengagement of the motor from the drive to allow free-wheeling of the unit when required.

It will be appreciated that propulsion motors other than electric motors can be employed, and that it may be desirable to incorporate more than one motor in an assembly, whether steerable or non-steerable.

The invention claimed is:

1. A steerable wheel assembly for a vehicle, comprising:
   a mounting bracket incorporating a vertical pivot mounting for attachment to the vehicle;
   a second bracket having a first arm carrying a road wheel and a second arm generally upstanding from the first and linked at the upper end thereof to the mounting bracket by a parallelogram linkage; and
   a spring and shock-absorber unit pivotally connected between the second bracket and the parallelogram linkage.

2. A steerable wheel assembly according to claim 1, wherein the parallelogram linkage comprises a parallel pair of rails, each rail being rotatably connected at one end thereof to the mounting bracket so as to be pivotable in a substantially vertical plane, and rotatably connected at the other end thereof to said second arm of the second bracket.

3. A steerable wheel assembly according to claim 2, wherein the spring and shock-absorber unit is pivotally connected at one end thereof to a slide in the parallelogram linkage, which is in turn pivotally connected to the mounting bracket and connected at the other end thereof to the second arm.

4. A steerable wheel assembly according to claim 3, wherein the slide is connected to the mounting bracket through a linear actuator whereby the distance between the slide and the mounting bracket can be adjusted.

5. A steerable wheel assembly according to claim 3, wherein the slide comprises runners located between the rails and adapted to engage with one or other of the rails to slide therealong, depending on the loading on the assembly.

6. A steerable wheel assembly according to claim 1, wherein the spring and shock-absorber unit is connected to an adjustable pivot mounting in said second arm, whereby the position of the mounting along the second arm may be adjusted.

7. A steerable wheel assembly according to claim 1, wherein the first arm also carries a drive motor for the road wheel.

8. A steerable wheel assembly according to claim 7, wherein the drive motor is an electric motor.

9. A steerable wheel assembly according to claim 1, wherein the longitudinal axes of the first and second arms subtend an obtuse angle.

10. A steerable wheel assembly according to claim 1, wherein the mounting bracket carries a linkage for a steering arm.

11. A steerable wheel assembly according to claim 1, wherein the second bracket incorporates a second vertical pivot mounting for attachment to the vehicle.

12. A steerable wheel assembly according to claim 1, wherein the vertical pivot mounting is a ball joint.

13. A vehicle having at least one steerable wheel assembly comprising:
   a mounting bracket incorporating a vertical pivot mounting for attachment to the vehicle;
   a second bracket having a first arm carrying a road wheel and a second arm generally upstanding from the first and linked at the upper end thereof to the mounting bracket by a parallelogram linkage; and
   a spring and shock-absorber unit pivot-ally connected between the second bracket and the parallelogram linkage.

* * * * *